US008019115B2

(12) United States Patent
Alasia et al.

(10) Patent No.: US 8,019,115 B2
(45) Date of Patent: Sep. 13, 2011

(54) OBJECT AUTHENTICATION USING A PORTABLE DIGITAL IMAGE ACQUISITION DEVICE

(75) Inventors: Alfred V. Alasia, Wellington, FL (US); Alfred J. Alasia, Royal Palm Beach, FL (US); Thomas C. Alasia, Wellington, FL (US); Slobodan Cvetkovic, Lake Worth, FL (US)

(73) Assignee: Graphic Security Systems Corp., Lake Worth, FL (US)

( * ) Notice: Subject to any disclaimer, the term of this patent is extended or adjusted under 35 U.S.C. 154(b) by 885 days.

(21) Appl. No.: 12/029,108

(22) Filed: Feb. 11, 2008

(65) Prior Publication Data

US 2008/0267514 A1 Oct. 30, 2008

Related U.S. Application Data

(60) Provisional application No. 60/913,931, filed on Apr. 25, 2007.

(51) Int. Cl.
*G06K 9/00* (2006.01)
*H04N 7/167* (2011.01)

(52) U.S. Cl. ....................................... 382/100; 380/232

(58) Field of Classification Search .................. 382/100, 382/114, 135, 138, 232, 235, 243, 244, 313; 380/232, 247; 705/67; 358/3.28; 713/155, 161, 168, 170, 176
See application file for complete search history.

(56) References Cited

U.S. PATENT DOCUMENTS

| | | | | |
|---|---|---|---|---|
| 5,692,068 | A * | 11/1997 | Bryenton et al. | 382/135 |
| 6,163,618 | A * | 12/2000 | Mukai | 382/135 |
| 7,232,072 | B1 * | 6/2007 | Bunte et al. | 235/462.45 |
| 2005/0100204 | A1 | 5/2005 | Afzal et al. | |
| 2005/0175230 | A1 | 8/2005 | Kortum et al. | |
| 2005/0237577 | A1 | 10/2005 | Alasia et al. | |

* cited by examiner

*Primary Examiner* — Abolfazl Tabatabai
(74) *Attorney, Agent, or Firm* — Hunton & Williams LLP

(57) ABSTRACT

A method is provided for determining whether a test object is an authentic object having an authentication image applied to an authentication image area thereof. The method comprises positioning and orienting a portable image acquisition device for selectively viewing and capturing a magnified image of a target surface area of the test object. The target surface area corresponds to the authentication image area of an authentic object. The method further comprises capturing a magnified digital image of the target surface area using the image capture acquisition device. The captured digital image is then processed to obtain a processed digital image and an authentication result is determined based on whether the processed digital image meets predetermined authentication criteria.

25 Claims, 3 Drawing Sheets

OBJECT AUTHENTICATION USING A PORTABLE DIGITAL IMAGE ACQUISITION DEVICE

This application claims the benefit of U.S. Provisional Application No. 60/913,931, filed Apr. 25, 2007, which is incorporated herein by reference in its entirety.

BACKGROUND OF THE INVENTION

Document falsification and product counterfeiting are significant problems that have been addressed in a variety of ways. One of the more successful approaches has been the use of latent or hidden images applied to or printed on objects to be protected. These images are generally not viewable without the assistance of specialized devices that render them visible.

One approach to the formation of a latent image is to optically encode the image so that, when printed, the image can be viewed only through the use of a corresponding decoding device. Such images may be used on virtually any form of printed document including legal documents, identification cards and papers, labels, currency, stamps, etc. They may also be applied to goods or packaging for goods subject to counterfeiting.

Objects to which an encoded image is applied may be authenticated by decoding the encoded image and comparing the decoded image to an expected authentication image. The authentication image may include information specific to the object being authenticated or information relating to a group of similar objects (e.g., products produced by a particular manufacturer or facility). Production and application of encoded images may be controlled so that they cannot easily be duplicated. Further, the encoded image may be configured so that tampering with the information on the document or label is readily apparent.

Authentication of documents and other objects "in the field" has typically required the use of hardware decoders such as lenticular or micro-array lenses that optically decode the encoded images. These lenses must have optical characteristics that correspond to the parameters used to encode and apply the authentication image and must be properly oriented in order for the user to decode and view the image.

Because they can only be used for encoded images with corresponding characteristics, hardware decoders are relatively inflexible tools. There are also circumstances where the use of an optical decoder to decode encoded images is impractical or undesirable. For example, authentication using an optical decoder requires immediate on-site comparison of the decoded image to the authentication image. This requires that the on-site inspector of the object being authenticated must be able to recognize differences between the decoded image and the expected authentication image. This is impractical in instances where there are many possible variations in the expected authentication image. It also may be undesirable for the on-site inspector to have access to information that may be embedded in the decoded image. Finally, real-time viewing using a typical hardware decoder does not produce a hard copy image that can be retained for future use. Any later investigation must rely on the viewer for evidence of the initial object inspection.

SUMMARY OF THE INVENTION

The present invention provides systems and methods for authentication of objects using magnified encoded images. Aspects of the invention provide a method for determining whether a test object is an authentic object having an authentication image applied to an authentication image area thereof. The method comprises positioning and orienting a portable image acquisition device for selectively viewing and capturing a magnified image of a target surface area of the test object. The target surface area corresponds to the authentication image area of an authentic object. The method further comprises capturing a magnified digital image of the target surface area using the image capture acquisition device. The captured digital image is then processed to obtain a processed digital image and an authentication result is determined based on whether the processed digital image meets predetermined authentication criteria.

Aspects of the invention also provide a system for determining whether a test object is an authentic object having an authentication image applied to an authentication image area thereof. The system comprises a portable digital image acquisition device for capturing a magnified digital image of at least a portion of the test object. The digital image acquisition device includes a lens device being easily manipulable for positioning and orienting the digital image acquisition device relative to the test object. The system further comprises an authentication processor in selective communication with the portable digital image acquisition device. The authentication processor includes an image processing module adapted for processing the magnified digital image captured by the portable digital image acquisition device to obtain a processed digital image. The system additionally comprises an authentication module adapted for determining an authentication result based on whether the processed digital image meets predetermined authentication image.

It is to be understood that both the foregoing general description and the following detailed description are exemplary and explanatory only, and are not restrictive of the invention as claimed. The accompanying drawings constitute a part of the specification, illustrate certain embodiments of the invention and, together with the detailed description, serve to explain the principles of the invention.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

Figure 1:
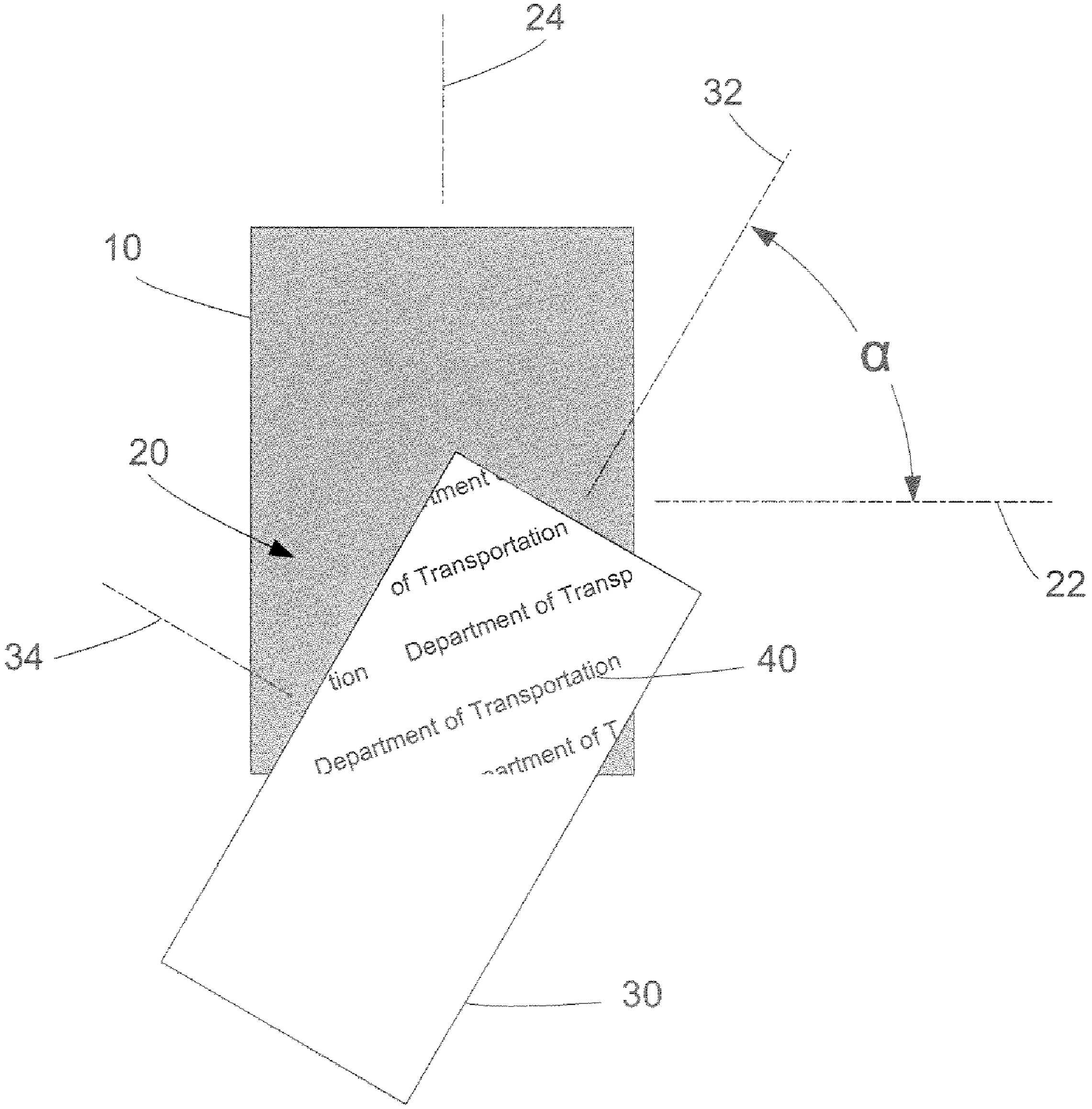
FIG. 1 is an illustration of the use of an optical decoder to decode a printed encoded authentication image.

The present invention provides systems and methods for authenticating documents, commercial products and other objects using authentication images that have been applied thereto. As used herein, the term "authentication image" means an image that is specially configured or printed so as to allow verification of the authenticity of an object to which the authentication image is applied. Authentication images may include images/indicia printed with special inks (e.g., inks visible only in particular wavelengths), or images/indicia that are constructed or printed so that certain content is not readily visible to the naked eye. For example, authentication images may be printed so as to be or include micro-printed content that is only readable under high magnification. Authentication images may also be graphically encoded, embedded or scrambled so that they cannot be viewed without decoding or unscrambling.

In the authentication methods of the invention, an image acquisition device is used to capture a digital image of a target area on an object where an authentication image is expected to be present. The captured image may then be viewed and/or decoded on-site or transmitted over a network for viewing and/or decoding. The image acquisition device may include a lens or lens device adapted to magnify the digital image to enhance its resolution thereby allowing the capability to view micro-printing and/or to decode a captured encoded image using software-based techniques. The methods of the invention may also include illuminating the target area with light at a particular wavelength in order to capture authentication images that are visible only when so illuminated. The authentication image may be illuminated and/or magnified by the image acquisition device. In some embodiments, the image acquisition device may include a lens device that illuminates the authentication image with light at the desired wavelength. In particular embodiments, the image acquisition device may include a lens device that can be used to illuminate and/or magnify authentication images at close range. Suitable lens devices may include those described in U.S. application Ser. No. 11/928,194 filed Oct. 30, 2007 ("'194 Application"), which is incorporated herein by reference in its entirety.

As described in U.S. application Ser. No. 11/207,437 filed Aug. 19, 2005 ("'437 Application") and U.S. application Ser. No. 11/068,350 filed Feb. 28, 2005 ("'350 Application"), both of which are incorporated herein by reference in their entirety, a digital image of an authentication image may be captured by an image acquisition device, downloaded or transmitted to an authentication processor, where the captured image may be viewed and/or processed to determine if the expected authentication image is present. If the authentication image is an optically or graphically encoded image, the captured image may be decoded using any of various software-based decoding techniques. Indicia and/or information may be determined from the decoded image and then used to authenticate the object or document to which the encoded image was applied.

Depending on the system, the captured image may be downloaded and processed on-site or transmitted over a network (e.g., by e-mail or other network transfer process) to a central processor where the image is processed and an authentication result generated. In some systems, the digital image may be captured by an on-site inspector who transmits the captured image to a separate processor (or series of processors) where the image is processed and, optionally, compared to an expected authentication image. The results may then be returned to the on-site inspector or other authorized personnel over the same or a different network. Thus, in some embodiments, the captured authentication image need never be viewed by a human being.

The authentication methods of the invention may be used to enhance the efficacy of authentication images of various types, including images formed using micro-printing techniques and optically encoded images. Optically encoded images are often formed as an authentication image embedded in a background or source image and printed on items that may be subject to alteration, falsification or counterfeiting. As used herein, the term "encoded image" or "encoded authentication image" refers to an image that is rasterized, scrambled, manipulated and/or hidden, such that when applied, embedded and/or concealed in a document or in a background field or in another image, the authentication image cannot be discerned from the base document material or background field or the other image without the use of an optical decoding device. Some encoded images are hidden so that their presence is difficult to discern from a background or primary image. An encoded image may be generated from an authentication image using a particular set of characteristics that include encoding parameters. Other encoded images are easily visible but are unreadable because the image content has been systematically scrambled or otherwise manipulated.

Encoded images of particular significance to the present invention are those that are configured to be optically decoded using a lens-based decoding device. Such images take advantage of the ability of certain types of lenses (e.g., a lenticular lens) to sample image content based on their optical characteristics. For example, a lenticular lens can be used to sample and magnify image content based on the lenticule frequency of the lens. The images used are typically encoded by one of several methods that involve establishing a regularized periodic pattern having a frequency corresponding to that of the lenticular lens to be used as a decoder, then introducing distortions of the pattern that corresponds to the content of the image being encoded. These distortions may be made so small as to render the image difficult or impossible to discern from the regularized pattern with the naked eye. Encoded images of this type can be produced in an analog fashion using specialized photographic equipment as disclosed in U.S. Pat. No. 3,937,565 or digitally as is disclosed in U.S. Pat. No. 5,708,717 ('717 Patent), both of which are incorporated herein by reference in their entirety.

Digitally encoded images can be embedded into a background or into other images so that the mere presence of the encoded image is difficult to discern. In some methods, a secondary image can be separately encoded then merged or embedded into the primary authentication image or the process of embedding may be accomplished in such a way that the secondary authentication image is encoded as it is embedded. With reference to FIG. 1, an encoded image 10 may be established using a primary or source authentication image 20 and a secondary authentication image 40, which is embedded into the primary image 20 in such a way that the secondary image 40 can only be viewed with a decoding device 30 of a predetermined frequency. The primary image may be a blank gray or colored background image as in the encoded image 10 of FIG. 1 or may include visible image content such as a design or photograph or any other form of indicia. The secondary image may also be any form of image or indicia and may include indicia related in some way to the primary image. In the example encoded image 10, the secondary image 40 is a repeating pattern based on the words "Department of Transportation." The secondary image can be separately encoded then merged or embedded into the primary image or the process of embedding may be accomplished in such a way that the secondary image is encoded as it is embedded. As shown in FIG. 1, the secondary image may be viewed by placing the decoding device 30 over the encoded image 10 at the correct orientation. In the example of FIG. 1, the decoding device has a horizontal axis 32 and a vertical axis 34 and the encoded image 10 has a horizontal axis 22 and a vertical axis 24. The secondary image 40 is revealed when the horizontal axis 32 of the decoding device 30 is oriented at the decoding angle a with respect to the horizontal axis 22 of the encoded image 10. The decoding angle a is an encoding parameter that is established prior to encoding and embedding the secondary image.

The methods by which the secondary image is embedded or merged with the primary image can be divided into two general approaches. In the first approach, a regularized periodic behavior is imposed on the primary image using a predetermined frequency. This is primarily accomplished by rasterizing the primary image at the predetermined frequency. The secondary image is then mapped to the primary image so that the regularized behavior of the primary image can be altered at locations corresponding to those in the secondary image that include image content. The alterations are small enough that they are difficult for the human eye to discern. However, when a lenticular lens having a frequency corresponding to the predetermined frequency is placed over the primary image, it will sample the primary image content in such a way that the alterations are brought out to form the latent secondary image.

In the second approach, the regularized periodic behavior is first imposed on the secondary image rather than the primary image, with alterations in that behavior occurring wherever there is content in the secondary image. The secondary image is then mapped to the primary image and the content of the primary image altered pixel by pixel based on the content of the encoded secondary image.

Another method of embedding an image is commonly used in banknotes and checks. In this method, a latent image is created by changing the direction of raster elements in the visible images at positions corresponding to the content in the hidden image. For example, vertical raster lines in the primary image may be changed to horizontal lines at the locations corresponding to the latent image. The latent image can typically be seen by tilting the banknote slightly. However, the deviations in the primary image can also be decoded using an optical decoder. This is because the raster lines of the primary image will run along the length of the lenticular line of the decoder at the positions where there is no hidden content, but will have only a cross section at the positions where there is a hidden content. This difference makes the hidden image appear much brighter than the visible when viewed through the decoder.

The common thread of all of the above graphical encoding methods and their resulting encoded images is that they involve deviations from regular periodic behavior (e.g., spatial location, tone density, raster angle). The regular periodic behavior and the deviations therefrom may be established based on the encoding methodology used and a predetermined set of encoding parameters. The deviations are made apparent through the use of a decoder having characteristics that correspond to one or more of the encoding parameters. For example, one of the encoding parameters may be the frequency of the regular periodic behavior. The decoder (whether hardware or software-based) must be configured according to that frequency. For example, in the case of a lenticular lens, the lens frequency is established so that the frequency of the regular periodic behavior is equal to the lens frequency or an even multiple of the lens frequency. The lenticular lens may then act as a content sampler/magnifier that emphasizes the deviations from the regularized behavior and assembles them into the secondary image.

A lenticular lens can be used to decode both visible encoded images whose content has been systematically scrambled and encoded images embedded into a primary image or background. As described in the in the '194 Application, such lenses may also be incorporated into an illuminating lens device through which decoded authentication images may be viewed or captured. As described in U.S. patent application Ser. No. 11/068,350, ('350 Application) however, software-based decoders can also be used to decode encoded images that have been digitally created or captured. These decoders may be adapted to decode any digital version of an optically encoded image including digital encoded images that have never been printed and printed encoded images that have been scanned or transformed by other means into digital form. The digital encoded images may be latent images embedded into background or primary images or may be visible images that have been systematically scrambled or manipulated. The primary image may be a blank image with no discernible content (e.g., a gray box) or may be an actual image with discernible content.

Software for digitally decoding digital encoded images may be incorporated into virtually any data processor. For the purpose of practicing the authentication methods of the present invention, the software may use any decoding methodology including, but not limited to, the methods described in the '350 Application. This includes (1) methods that require information on the content of the primary image, the secondary image or both the primary and secondary images; and (2) methods that do not require any foreknowledge regarding image content. Both of these method types require knowledge of the encoding parameters used to encode and embed the secondary image. Depending on the encoding methodology, the encoding parameters may be retrievable from a database. In some cases, one or more encoding parameters may be calculated from the image itself using special image analysis techniques.

All of the above-described encoded images, as well as non-encoded images and micro-printed indicia, may be printed or applied using a medium that is viewable only when illuminated by a particularly light wavelength. In many case, the medium used is viewable only under light outside the visible spectrum (e.g., infrared or ultraviolet light).

As described in the '350 Application, printed encoded images may be scanned or digitally captured using an image acquisition device. As used herein, the terms "image capture device" and "image acquisition device" mean any device or system used to capture or produce an image of a document or object or target portions thereof. An image acquisition device may be adapted to magnify and record an image. Such a device may have a built in magnification feature that provides this feature. Image acquisition devices may be any portable or non-portable device. Image acquisition devices include but are not limited to scanners, digital cameras, portable phones, personal digital assistants (PDAs) and systems having a combination of an analog camera and a frame grabber. The image acquisition device may be adapted for capturing images using light in the visible or non-visible (e.g., UV and IR) portions of the electromagnetic spectrum. The image acquisition device may scan or capture printed encoded images.

A captured authentication image (i.e., a printed encoded image that has been scanned or otherwise digitally captured using a digital image acquisition device) may be viewed or processed using an authentication processor. If the authentication image is an encoded image, the authentication processor may be adapted to apply one or more software-based decoding algorithms to produce a decoding result. Using such methods as optical character recognition (OCR), the authentication processor may also be adapted to extract indicia and/or information from the processed image and to compare the extracted indicia and/or information to predetermined authentication criteria. As will be discussed, the authentication processor may be at a location remote from the image acquisition device.

In general, a high resolution of an image may improve the ability to decode an encoded image. It has been found that image acquisition devices having a high magnification capability are particularly well adapted for use in viewing and/or capturing higher resolution images of security printing and encoded images for review and, if appropriate, decoding. In particular, optical magnification provides higher optical dpi (dots-per-inch) resolution thereby allowing an improved ability to view lines within the encoded image, an improved quality of the decoding function and a reduced influence of image imperfections. Such magnification may be achieved using a specialized image acquisition device with a magnification capability built in, a lens based device, or through the use of a standard image acquisition device to which a magnification device has been added or attached. For example, a lens with magnification capability may be attached or built-into a specialized image acquisition device, a lens based attachment, and/or a standard image acquisition device to provide the desired magnification. In particular, a lens device such as those disclosed in the '194 Application may be used. These may be configured as an attachment for standard digital cameras. The devices can also be used to significantly increase the resolution of viewed and/or captured images. As previously noted, these devices may also be used to illuminate a target area with a desired light frequency when an image of the target area is being captured. In some embodiments, a separate illuminator may be used to illuminate the target area. Such illuminators may be operated independently of or in conjunction with a lens or other magnification device.

Figure 2:
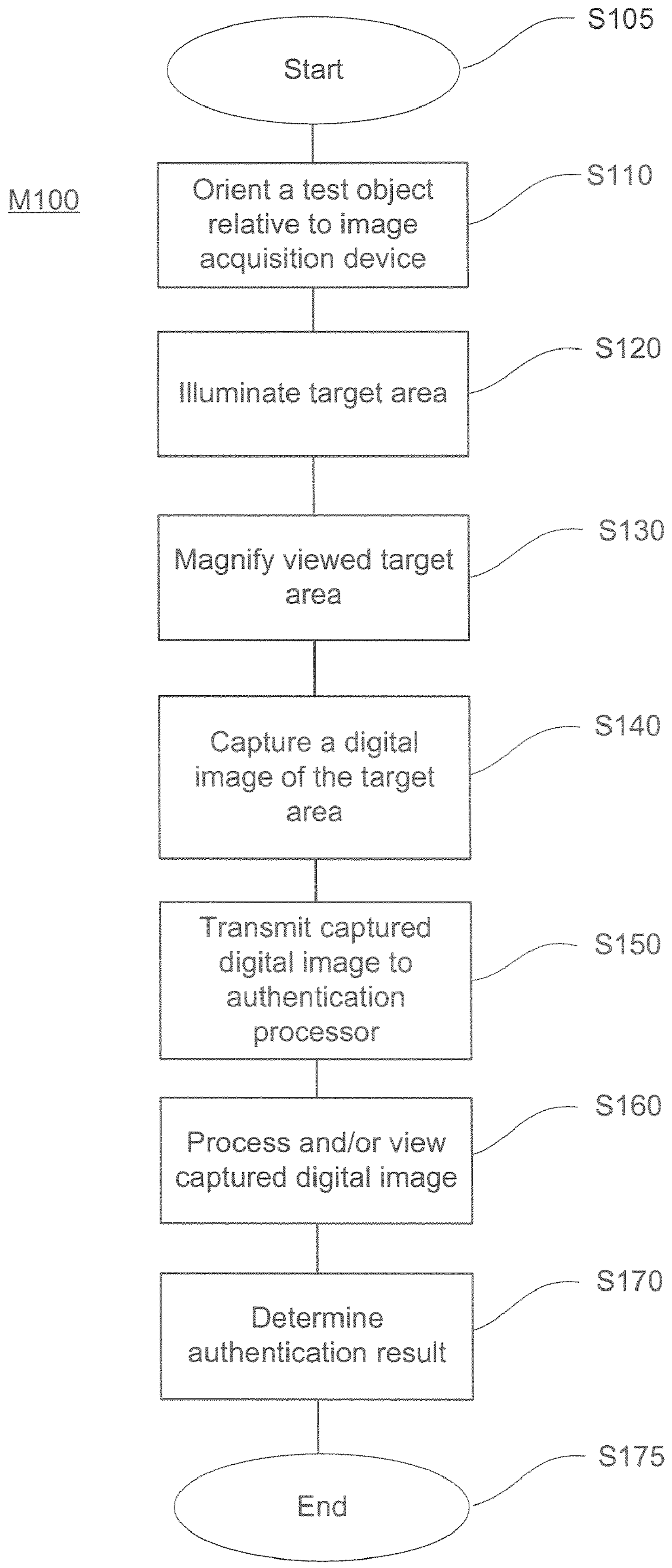
FIG. 2 is a flowchart of a method of authenticating an object according to an embodiment of the invention.

With reference now to FIG. 2, a basic authentication method M100 according to the present invention makes use of the ability to verify the authenticity of an object. The method M100 may be used to inspect a test object to determine if an expected authentication image has been applied to a target area thereof, the authentication image having been applied to the target area of all authentic objects. As used herein, the term "authentic" typically indicates that an object was produced by an authorized source or in an authorized manner. The expected authentication image may be a micro-printed image or an encoded image or an ordinary image printed in a medium viewable only under a particular light frequency. The expected authentication image may be the same for every object being tested or may be a variable authentication image that is different for each object. Any object not carrying the authentication image may be assumed to be indicative of non-authenticity or indicative that the object or indicia applied thereto has not been altered.

At S110, a test object may be oriented relative to the image acquisition device. It will be understood that in many instances, the test object will remain stationary while the image acquisition device is positioned rather than the other way around. In either case, the relative positions of the object and the image acquisition device are established so as to facilitate the viewing or capture of an image of the target area. This may be accomplished by an on-site inspector, by a user and/or observer of the object, the object itself (in the case of a self-orienting object), or by a processor and/or device. Optionally, at S120, the target area may be illuminated with light in a predetermined wavelength range. This range may be established base on the medium used to apply the authentication image to authentic objects. For example, if UV ink is used, light applied to the target area may be in a range of 150 nm to 800 nm.

It will be understood that the action of illuminating the target area may be carried out by a light source or illuminator internal to the image acquisition device or to a lens device configured for engagement by or attachment to the image acquisition device. Even if the image is to be viewed in visible light, close illumination serves to enhance the ability of the image capturing device to resolve the image, particularly if the image is also magnified.

The light emitted from the light sources at the predetermined frequency range may reveal ink, information, or data that would otherwise have been indecipherable or invisible. The predetermined frequency range is selected based on the viewability of the authentication image when illuminated by light in the predetermined frequency range. The predetermined frequency range includes ultraviolet light frequency and an infrared light frequency. As noted above, the predetermined frequency range may be about 150 nm to about 800 nm. The predetermined frequency range may also be about 300 nm to about 450 nm. The predetermined frequency range may further be about 370 nm to about 375 nm. The light sources may emit a concentrated portion of light on a particular area of the authentication image.

The light source may include a device to diffuse light or may include a function to diffuse light. The light diffuser device may be any shape. For even distribution of light over the authentication image, the light diffuser may be shaped as a "ribbed" cone.

The wavelength of the light revealed by the light source may be broadened and/or narrowed by a light filter. The light filter may include a colored filter, a split field filter, a polarized filter or any other filter used in digital photography. The filter can function to assist in viewing and/or capturing authentication images. The light filter may be a long pass filter, short pass filter, or a band pass filter. A long pass filter functions to transmit a wide spectral band of long wavelength radiation thereby blocking short wavelength radiation. A short pass filter functions to transmit a wide spectral band of short wavelength radiation thereby blocking long wavelength radiation.

The type of light source can be varied. In many cases, the light source may be an LED, incandescent bulb, fluorescent bulb, or halogen bulb. LEDs are preferred because they are typically of small size, but still produce a substantial amount of light versus the amount of power they consume. The light source may provide constant illumination or a momentary flash timed to coincide with image acquisition. The flash device or other light source may include a filter to tailor the illumination spectrum. Power can be delivered to the light source by any electrical power source, although battery power is preferred to make the lens-based device mobile and independent of its proximity to a stationary power supply, such as an electrical outlet.

At S130, the authentication image may optionally be magnified by the image acquisition device or a lens-based device used in conjunction with the image acquisition device. The image acquisition device may include a magnifying lens with magnification capability or an attachment having lens with magnification capability. The magnifying lens may magnify the authentication image for viewing and/or capturing. The magnifying lens may allow an image to be viewed and/or captured from 6 to 10 microns. In some embodiments, the lens may be a 10-60× lens. The lens may be interchangeable and may interact with a zoom lens or regular lens of the image acquisition device. The lens may interact with the flash of an image acquisition device. Further, the lens may interact with the image acquisition device to increase or decrease the magnification of the authentication image. The magnification of the lens may be manual or automatic. Additionally, the lens may be a physical lens or an electronic/digital lens.

At S140, a magnified digital image of the test object is captured using the image acquisition device. The captured digital image may include all or a portion of the object as long as it includes a target area where the authentication image would be applied on an authentic object. The captured digital image may be configured so that only the target area is captured or may be configured so that the target area is included in a larger view. In either case, the captured image may also include identifiable orientation marks that allow the identification and proper orientation of the target area portion of the captured digital image. At S150, the captured digital image may be downloaded to or sent to an authentication processor. At S160, the captured digital image is viewed and or processed by the authentication processor. Some or all of the authentication processor may be co-located with the inspection site (i.e., the location where the digital image of the test object is captured) and some or all of the authentication processor may be remote from the inspection site. In either case, the authentication processor may be connected to the image acquisition device over a network. The captured digital image may be transmitted over the network in any manner such as by e-mail or other transfer process. In some embodiments, the digital image may transmitted over a wireless telephone or other telecommunications network. It can also be sent as an attachment to any form of e-mail or text or multi-media message.

The authentication processor may be configured to automatically carry out some or all of the remaining steps of the method M100. If necessary, the authentication may verify the authentication of the object using the captured image and authentication criteria, which may include an expected authentication image. Also, if the authentication image is an encoded image, the authentication processor may decode the authentication image. In such instances, the authentication processor may determine one or more of the encoding parameters used to encode the authentication image. The number of parameters required may depend on the specific digital decoding methodology used. The encoding parameters may be obtained from data storage where they are placed at the time of encoding. This data storage may be a part of or co-located with the authentication processor or may be disposed in a separate database processor or server accessible to the authentication processor over a network. The data storage may also take the form of a magnetic stripe, laser card, smart card, processor chip, memory chip, flash memory or bar code, which can be applied or attached to or otherwise associated with an object to which an authentication image is applied. The encoding parameters may be object-specific or may be constant for a particular set of objects. In some embodiments, some or all of the encoding parameters may be received with an encoding request or determined from the content of the image.

In some embodiments, the method may be adapted to determine whether the captured authentication image comprised micro-printing or rasters formed as a particular shape. Such printing devices may be identified in both encoded and non-encoded images.

The authentication processor may use object landmarks to orient the target area of the captured digital image for viewing and/or decoding. These landmarks may be based on the inherent geometry or topology of the object or may be specifically applied at the time the authentication image is applied to authentic objects. In the latter case, the presence of such landmarks could be used as an initial authentication check. It will be understood by those of ordinary skill in the art that if the digital image is captured in such a way that the object is always oriented in exactly the same way relative to the image acquisition device, there may be no need for digital orientation of the captured image. For example, if the test objects are documents that can be precisely positioned for scanning, the orientation of the target area may be sufficiently constant that orientation of the captured digital image is unnecessary.

At S170, an authentication result is established. This may involve a sequence of criteria beginning with whether an image is even present in the target area. If an image is present, it may be directly compared to an authentication image or further processed to provide a result that can be compared to an authentication image or information derivable from an authentication image. Thus, verifying the authentication of the image may comprise, inter alia, the actions of viewing the captured image an/or comparing it to an expected authentication image, decoding the authentication image, and deriving information from the captured image or a decoded version of the captured image. The method ends at S175.

In some embodiments, once the target area of the captured digital image is oriented, the authentication processor may apply a digital decoding methodology to the captured digital image to produce a decoding result. The decoding result may then be compared to authentication criteria to determine an authentication result. This may be accomplished by displaying the decoding result for visual comparison to the authentication image. Alternatively, OCR or other pattern recognition software can be used to compare the decoding result to the authentication image. In instances where the authentication image contains information that is object-specific, the information content of the decoding result may be compared to information derived directly from the object rather than to the original authentication image.

Optical magnification may be used in conjunction with the digital decoding method to reduce the influence of imperfections in the captured digital image and improve the ability to sample the captured digital image. In some embodiments, the decoding methodology samples one or more lines of the captured digital image at a frequency and an angle matching the encoding frequency. For example, one or more sampled lines of the captured digital image may be combined to generate one line of a decoding result. The optical magnification of the image determines the actual pixel spacing between the sampled lines. The physical spacing of the image should match the lines spacing used during the encoding, or the line spacing of the equivalent magnifying lens. The number of pixels between the sampled lines of the magnifying lens and the encoding parameters is calculated. A physical measurement, such as picture of a calibration grid, may be used to obtain a scale factor for the magnifying lens. The physical measurement may be calculated automatically. The digital decoding methodology enhances the sampled lines of the captured digital image to remove an gaps between lines to produce a decoding result.

An authentication determination is made based on the comparison of the decoding result to the authentication criteria. This determination may be made by a human reviewer of the decoding result or may be made automatically by the authentication processor. In either, case, the authentication result may be stored and/or returned to a user or other authorized requestor(s). In embodiments where the authentication determination is made at a location remote from the inspection site, the authentication determination may be transmitted to the inspection site.

When viewing and/or capturing an image one must consider how to (a) determine the actual pixel-per-inch resolution of the captured image; and (b) compensate for the different types of geometrical distortion that can be induced by the image acquisition device. Assuming the image acquisition device maintains the same distance from the object and the zoom function is not used. For example, the image acquisition device is positioned directly on the surface of the object thereby providing a consistent capturing distance. However, if the zoom function is used or the image acquisition device fails to maintain a consistent distance pre-calculated values are difficult to use. The positions and distances of the reference points on the object and the scale factors of the image will need to be recalculated.

Numerous methods may be used to determine the actual pixel-per-inch resolution of the captured image. Two of the methods are using calibration to determine the real pixel-to-pixel resolution of the image and rescaling a decoding frequency.

Generally, images captured by a scanner have an actual DPI resolution written into the header of the scanned file. Thus, the DPI is consistent and the DPI value from the file reflects the pixel-per-inch size of the image.

When an image is viewed and/or captured using a digital camera typically a fixed value of 180 DPI (or in some rare cases 72 DPI) is written in the image file header. Thus, the DPI value from the file cannot be relied upon to reflect the real pixel-per-inch size of the viewed and/or capture object. Since, the DPI value is unreliable the distance between the halftone pattern elements cannot be calculated when using a digital camera. The digital camera can be calibrated to determine the real pixels-per-inch resolution of the viewed and/or captured image. The scale factor of the digital camera can be calculated. In particular, the fixed DPI of the viewed and/or captured images can be internally replaced with a real DPI calculated for the image acquisition device and digital camera. The scale factor calculation occurs by taking a picture of a reference pattern, whose physical dimensions are known. Alternatively or in addition, the image acquisition device or attached lens device may produce repeatable effects on captured images that may be used as a reference. For example, a magnifier may limit the captured field to a circle with a known, fixed diameter. In either case, if there are 1800 pixels covering one inch of the reference pattern then the resolution is 1800 pixels-per-inch. Next, the scale factor can be determined by dividing the reference pattern resolution by the actual resolution written into the image header file. In this example, the scale factor would be calculated as 1800/180=10. Upon calculating the scale factor, the actual resolution written in the image header file may be set up to reflect the resolution of the reference pattern. For example, 1800 DPI may be the new resolution of the image file header thereby replacing the fixed resolution value of 180 DPI.

Another method is to rescale the frequency with which an encoded image is to be decoded. The decoding frequency is calculated using the frequency line per inch of a security or encoded image and the scale factor of the image acquisition device and digital camera calculated above. The frequency line per inch of a security or encoded image is divided by the scale factor to provide the decoding frequency. For example, to determine the decoding frequency using an encoded image generated with a 200 lines per inch frequency, the 200 lines per inch frequency of the image would be divided by the scale factor of 10. The calculation would result in a decoding frequency of 200/10=20 lines per inch. Rescaling the decoding frequency generally makes it easier to mingle images from the scanner and from the camera in the same application.

Geometrical distortion must also be considered when viewing and/or capturing an encoded image. Misalignment and/or rotation can distort an object, however, both can be compensated by decoding software. The decoding software can calculate the angle of rotation in the viewed and/or captured image. Of the many methods used to calculated the rotation angle one requires using the positions of some easily located reference points on the object or looking for a maximum of a Radon transform for an image with dominant line structures. Once the rotation angle is calculated, the captured image may be held in its referent position, to avoid distortion caused by the rotation process (e.g. interpolation on the digital grid blurs the image). The encoded image decoding parameters use the adjusted rotation angle. For example, if an encoded image is embedded with 15 degrees screen angle, and it was calculated that the object in the captured image was rotated by 3 degrees the adjusted angle of 15+3=18 degrees should be used for the decoding algorithm.

In certain image acquisition devices such as cell phones and PDA's, distortion may be caused by camera optics, better known as barrel distortion. Barrel distortion occurs when you take a picture of the square that covers most of the field of view and the sides of the square are not straight. Barrel distortion can be corrected by directly applying an inverse geometrical transform to the captured image or implementing the inverse transform in the decoding algorithm, to minimize the effects of the additional image processing operations (e.g. blurring the image by interpolation on the digital grid, adding to the processing time, etc.).

Further, in cameras, a problem may occur if the focal plane of a camera is not aligned with the object plane. The physically equidistant points on the object may have different pixel distances thereby causing linear distortion. Linear distortion may be compensated for using strategically positioned reference points on the object surface to calculate parameters for the inverse transformation.

Figure 3:
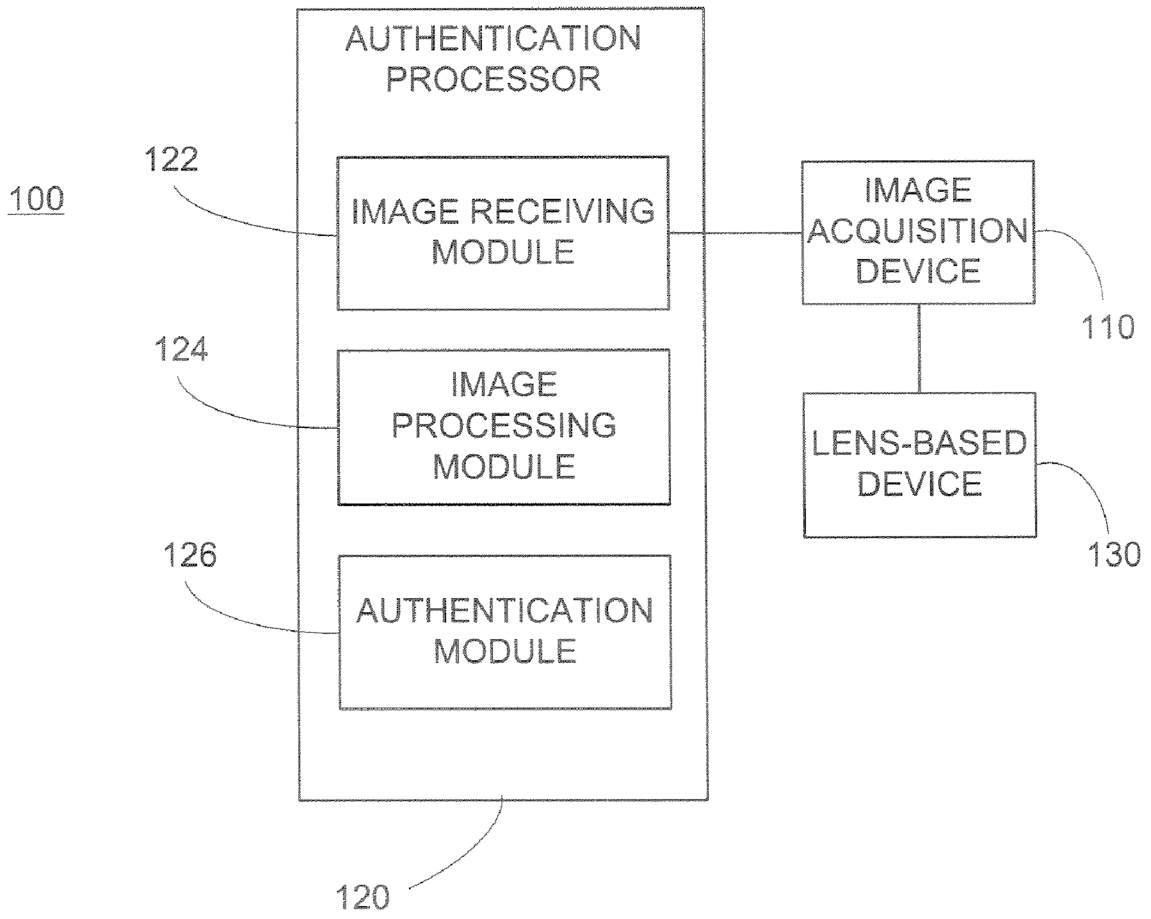
FIG. 3 is an illustration of an object authentication system according to an embodiment of the invention.

With reference to FIG. 3, the method M100 and other methods according to the invention may be carried out using an object authentication system 100 comprising a digital image acquisition device 110 and an authentication processor 120. The object authentication system 120 may also comprise an encoding information database that may be included in or in communication with the authentication processor 120. The object authentication system 100 is configured for inspection and authentication of test objects to verify the presence of an authentication image thereon. Some or all of the encoding parameters used to encode the authentication image may be stored in the encoding information database so that they are accessible to the authentication processor 120.

The image acquisition device 110 may be any device adapted for magnifying, illuminating and recording a digital image of at least a portion of the test object containing a target area in which, on authentic objects, an authentication image will have been applied. As noted above, this device may have a built-in magnification and illumination feature or may have an attachment that provides these feature. In an embodiment, a lens-based device 130 attachment may be used in conjunction with a standard digital camera to illuminate, magnify and capture a digital image of an authentication image. In particular, the lens-based device may illuminate and magnify an authentication image printed on the label of an object to be authenticated. The lens-based device may include a housing, at least one light source for illuminating an authentication image in a predetermined frequency range, and a lens for magnifying the authentication image. Similar lens-based devices, field microscopes or other illuminating and/or magnifying attachments may be fitted to virtually any form of portable or non-portable digital image capturing device, including various types of digital cameras, scanners, cellphones, PDAs, etc.

The authentication processor 120 may be any data processor configured for receiving and processing digital images. The authentication processor 120 includes an image receiving module 122 adapted for selective communication with the image acquisition device 110 and for receiving captured digital images therefrom. The image receiving module 122 transfers the captured digital images to an image processing module 124. The captured digital image may also be stored in a database in the authentication processor. The image processing module 124 may be adapted for performing any preprocessing required before the captured digital image can be viewed and/or decoded. This may include identifying landmarks in the target area and orienting the captured digital image accordingly.

The authentication processor 120 also includes an authentication module 126. The authentication module 126 is configured to verify the authenticity of the object using the authentication image. The authentication module 126 may include a decoding module. The decoding module may be programmed with digital decoding software adapted for performing one or more decoding algorithms on the captured digital image to produce a decoding result. The decoding module may obtain from the encoding information database any information (e.g., the authentication image and encoding parameters) needed for decoding the captured encoded image. Some encoding information may be determined or calculated by image analysis. The decoding result may be passed to the authentication module 128, which compares the decoding result to one or more authentication criteria to establish an authentication result. The decoding result, the authentication result or both may be stored in memory, or in a local or remote database, or displayed for use by an on-site inspector or other user.

The components of the authentication system 100 may be interconnected via any suitable means including over a network. The authentication processor 120 may take the form of a portable processing device that may be carried by an individual inspector along with a hand-held image acquisition device (e.g., a portable scanner or digital camera). In some embodiments of the invention, the image acquisition device and the authentication processor may actually be integrated into a single unit. Alternatively, the inspector may carry only a digital acquisition device 110 that is selectively connectable to a remotely located authentication processor 120. For example, a scanning device may be configured to send a captured image to the authentication processor by electronic mail. In another example, a wireless phone with imaging capability can be used to capture an image and forward it to the authentication processor over a telecommunications network. A practical application of this aspect is a scenario in which a potential purchaser or field inspector of a product captures an image of the product using a camera phone and phones in an authentication request to an authentication processor. The authentication result could be returned to the requestor over the phone network in, for example, a text or multi-media message.

The authentication system 100 is well adapted for use in authenticating a large number of similar objects such as, for example, packaged items in a warehouse or a large number of similar documents. The authentication processor 120 may be adapted so that information relating to individual objects may be entered or derived from the captured digital image. This allows the association of the captured digital image with the particular object. This, in turn, allows the retrieval of object-specific encoding information, which may be required for decoding the captured authentication image or for determining an authentication result.

It will be understood that if the encoding information is not object-specific, a group of test objects with the same expected authentication image can be authenticated by the authentication processor 120 using a single set of encoding information. This set of encoding information can be obtained from the encoding information database once and stored in the memory of the authentication processor 120 where it is accessible to the authentication modules 126.

The functions of the authentication processor need not be carried out on a single processing device. They may, instead be distributed among a plurality of processors, which may be interconnected over a network. Further, the encoding information required for decoding the captured encoded images taken from test objects and the decoding and authentication results may be stored in databases that are accessible to various users over the same or a different network.

The authentication systems of the invention are highly flexible and can be used in a wide variety of authentication scenarios. In a typical scenario, an encoded authentication image is applied to the packaging of a client manufacturer's product that is subject to counterfeiting or tampering. An on-site inspector equipped with a portable inspection processor and a magnifying image acquisition device may be dispatched to a site such as a warehouse where a group of packaged products are stored. The inspector may use the image acquisition device to scan or otherwise capture a digital image of the target area of a suspect product package. Additional information such as date, time, location, product serial number, etc., may be entered by the inspector. Some of this information may alternatively be entered automatically by the inspection processor. If the inspection processor is equipped with its own decoding and authentication software, the inspector may authenticate the suspect product immediately. Alternatively or in addition, the inspection processor may be used to submit an authentication request to a remote authentication server. Authentication requests may be sent on an individual item basis. Alternatively, captured authentication images and associated product information may collected for multiple test items and submitted as part of a single authentication request. This would allow, for example, the inspection processor to be used independently of a network connection to collect authentication data from a plurality of test items, then connect to the network (e.g., by logging into an Internet website) for submitting a single batch authentication request.

Upon receiving the authentication request from the inspection processor, the authentication server validates the request, retrieves any required image encoding information from the encoding information database and processes the captured digital image. The captured image is decoded and compared to retrieved authentication criteria to determine an authentication result. The authentication result is then stored in the authentication database. A representative of the manufacturer or other authorized user is then able to access the authentication results by connecting to the authentication database. In some embodiments, this may be accomplished by logging into a security-controlled website and submitting a request for authentication results for the test objects.

In some embodiments, the authentication server may be configured for access through a web site. Authorized users can log onto the web site, upload scanned images, and immediately receive an authentication result on their browser. Results can also be stored in an authentication database for future reviews.

In an exemplary embodiment, a law enforcement officer may be able to verify the authenticity of a drivers license using a portable image acquisition device. The officer may use the device for viewing and capturing an authentication image. The officer may be able to obtain an authentication result. This approach would help detect fraudulent drivers licenses which can deter individuals from producing fraudulent licenses, and prevent the sale of tobacco and alcohol to under age persons.

In some embodiments, a web-based authentication service may be implemented using standards for interface and data representation, such as SOAP and XML, to enable third parties to connect their information services and software to the authentication service. This approach would enable seamless authentication request/response flow among diverse platforms and software applications.

As discussed above, the functions of the authentication systems and the actions of the authentication methods of the invention may be carried out using a single data processor or may be distributed among multiple interconnected processors. In some embodiments, for example, the decoding and authentication functions may be carried out by different processors. Aspects of decoding functions themselves may be carried out using a single processor or a plurality of networked processors.

It will be understood that the authentication methods and systems of the invention may be used to review and/or decode magnified captured images of any form of encoded image and that the magnified captured images may be decoded using any software-based method.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

While the foregoing illustrates and describes exemplary embodiments of this invention, it is to be understood that the invention is not limited to the construction disclosed herein. The invention can be embodied in other specific forms without departing from its spirit or essential attributes.

What is claimed is:

1. A method for determining whether a test object is an authentic object having an authentication image applied to an authentication image area thereof, the method comprising:

positioning and orienting a portable image acquisition device for selectively viewing and capturing a magnified image of a target surface area of the test object, the target surface area corresponding to the authentication image area of an authentic object;

capturing a magnified digital image of the target surface area using the image acquisition device;

processing the captured digital image to obtain a processed digital image; and determining an authentication result based on whether the processed digital image meets predetermined authentication criteria.

2. A method according to claim 1 wherein the action of processing the captured digital image is carried out by a decoding processor remote from the portable image acquisition device, and wherein the method further comprises:

transmitting the captured digital image from the portable image acquisition device to the decoding processor over a network.

3. A method according to claim 2 wherein the captured digital image is transmitted in an electronic mail message.

4. A method according to claim 2 wherein the authentication result is transmitted via one of the set consisting of a text message and a multi-media message over a telecommunications network.

5. A method according to claim 2, wherein the network comprises one or more of the set consisting of a local area data processing network, a wide area data processing network and a telecommunications network.

6. A method according to claim 1 wherein the action of processing the captured digital image includes:

applying a digital image decoding algorithm to the captured digital image to produce a decoding result.

7. A method according to claim 6 wherein the action of determining an authentication result includes:

comparing the decoding result to the authentication image.

8. A method according to claim 6 wherein the action of determining an authentication result includes:

extracting information from the decoding result; and comparing the extracted information to information that is determinable by visual inspection of the test object.

9. A method according to claim 1 wherein the portable image acquisition device is capable of capturing a digital image with a resolution of about 10 microns.

10. A method according to claim 1, wherein the portable image acquisition device is configured to capture images formed by light in a predetermined wavelength range.

11. A method according to claim 10 further comprising:

illuminating the target surface area with light in the predetermined wavelength range.

12. A method according to claim 10, wherein the portable image acquisition device has a magnifying lens device with an internally mounted illuminator configured for illuminating the target surface area with light in the predetermined wavelength range.

13. A method according to claim 10, wherein the predetermined wavelength range includes one of the set consisting of an ultraviolet wavelength and an infrared wavelength.

14. A system according to claim 13 wherein the portable digital acquisition device comprises one of the set consisting of a hand-held digital camera, a camera phone, and a PDA.

15. A system according to claim 13 wherein the portable digital image acquisition device is capable of capturing a digital image with a resolution of about 10 microns.

16. A system according to claim 13, wherein the image acquisition device is configured to capture images formed by light in a predetermined wavelength range.

17. A system according to claim 16, wherein the magnifying lens device is adapted for illuminating the at least a portion of the test object with light in the predetermined wavelength range.

18. A method according to claim 17, wherein the magnifying lens device comprises an internally mounted illuminator configured for illuminating the at least a portion of the test object with light in the predetermined wavelength range.

19. A system according to claim 16, wherein the predetermined wavelength range includes one of the set consisting of an ultraviolet wavelength and an infrared wavelength.

20. A system for determining whether a test object is an authentic object having an authentication image applied to an authentication image area thereof, the system comprising:

a portable digital image acquisition device for capturing a magnified digital image of at least a portion of the test object, the digital image acquisition device including a magnifying lens device and being easily manipulable for positioning and orienting the digital image acquisition device relative to the test object;

an authentication processor in selective communication with the portable digital image acquisition device, the authentication processor including an image processing module adapted for processing the magnified digital image captured by the portable digital image acquisition device to obtain a processed digital image; and an authentication module adapted for determining an authentication result based on whether the processed digital image meets predetermined authentication image.

21. A system according to claim 20 wherein the authentication processor further includes an image receiving module adapted to receive the magnified digital images from the portable digital image acquisition device over a network.

22. A method according to claim 21 wherein the image receiving module is adapted to receive the magnified digital image via electronic mail.

23. A method according to claim 21 wherein the network is a telecommunications network and the image receiving module is adapted to receive the magnified digital image via one of the set consisting of a text message and a multi-media message.

24. A system according to claim 20 wherein an authentic object has an expected encoded image applied thereto, the expected encoded image having been constructed by encoding an authentication image using a set of one or more encoding parameters and wherein the image processing module comprises:

a decoding module adapted for applying a digital image decoding algorithm to the magnified digital image to produce a decoding result.

25. A system according to claim 24 wherein the authentication module is adapted for comparing the decoding result to object authentication criteria to determine the authentication result.

* * * * *